(12) United States Patent
Huang

(10) Patent No.: US 8,268,435 B2
(45) Date of Patent: Sep. 18, 2012

(54) RETROREFLECTIVE SHEETING

(75) Inventor: Kejian (Kevin) Huang, Buffalo Grove, IL (US)

(73) Assignee: Avery Dennison Corporation, Pasadena, CA (US)

( * ) Notice: Subject to any disclaimer, the term of this patent is extended or adjusted under 35 U.S.C. 154(b) by 936 days.

(21) Appl. No.: 11/458,769

(22) Filed: Jul. 20, 2006

(65) Prior Publication Data

US 2007/0071932 A1   Mar. 29, 2007

Related U.S. Application Data

(60) Provisional application No. 60/720,523, filed on Sep. 26, 2005.

(51) Int. Cl.
*B32B 3/00* (2006.01)
*B32B 3/30* (2006.01)

(52) U.S. Cl. .................. 428/141; 428/156; 428/40.1

(58) Field of Classification Search .................. 428/156, 428/40.1, 141
See application file for complete search history.

(56) References Cited

U.S. PATENT DOCUMENTS

| | | | |
|---|---|---|---|
| 2,948,191 A * | 8/1960 | Hodgson, Jr. et al. | 359/538 |
| 3,357,772 A * | 12/1967 | Rowland | 359/619 |
| 3,684,348 A | 8/1972 | Rowland | 350/103 |
| 3,712,706 A | 1/1973 | Stamm | 350/103 |
| 3,814,500 A | 6/1974 | Ebenbichler | 350/97 |
| 3,833,285 A | 9/1974 | Heenan | 350/103 |
| 4,478,769 A | 10/1984 | Pricone et al. | 264/1.6 |
| 4,589,740 A | 5/1986 | Durremberger | 350/487 |
| 4,645,301 A | 2/1987 | Orensteen et al. | 350/167 |
| 4,688,894 A | 8/1987 | Hockert | 350/105 |
| 4,691,993 A | 9/1987 | Porter et al. | 350/105 |
| 4,708,920 A | 11/1987 | Orensteen et al. | 430/11 |
| 4,714,656 A | 12/1987 | Bradshaw et al. | 428/411.1 |
| 4,726,134 A | 2/1988 | Woltman | 40/582 |
| 4,758,469 A * | 7/1988 | Lange | 428/325 |
| 4,775,219 A | 10/1988 | Appeldorn et al. | 350/103 |
| 4,938,563 A | 7/1990 | Nelson et al. | 350/103 |
| 5,187,599 A | 2/1993 | Nakanishi et al. | 359/41 |
| 5,254,390 A | 10/1993 | Lu | 428/156 |
| 5,420,720 A | 5/1995 | Gal et al. | 359/622 |
| 5,450,235 A | 9/1995 | Smith et al. | 359/529 |
| 5,463,498 A | 10/1995 | Gal et al. | 359/622 |
| 5,468,530 A | 11/1995 | Gotz et al. | 428/36.4 |
| 5,468,540 A | 11/1995 | Lu | 428/156 |
| 5,555,476 A | 9/1996 | Suzuki et al. | 359/40 |
| 5,617,492 A | 4/1997 | Beach et al. | 385/33 |
| 5,670,096 A | 9/1997 | Lu | 264/1.1 |
| 5,770,124 A | 6/1998 | Marecki et al. | 264/1.36 |
| 5,825,803 A | 10/1998 | Labranche et al. | 372/101 |
| 5,866,236 A * | 2/1999 | Faykish et al. | 428/195.1 |

(Continued)

FOREIGN PATENT DOCUMENTS

WO    WO 2004/063978    *  7/2004 .................. 428/64.4

*Primary Examiner* — Maria Veronica Ewald
*Assistant Examiner* — Nancy Rosenberg
(74) *Attorney, Agent, or Firm* — Avery Dennison Corporation

(57) ABSTRACT

Retroreflective sheeting (10) comprising a retroreflecting layer (12), which has an array of retroreflective elements (34) formed thereon, and a divergence-enhancing layer (14) which is positioned in front of the retroreflecting layer (12). The divergence-enhancing layer (14) has localized aberration regions (42) which change the divergence of light traveling therethrough. The placement of the localized aberration regions (42) relative to the retroreflective elements (34) broadens the divergence range of the sheeting (10).

20 Claims, 4 Drawing Sheets

U.S. PATENT DOCUMENTS

| | | | |
|---|---|---|---|
| 5,875,058 A | 2/1999 | Grubman | 359/654 |
| 5,877,824 A | 3/1999 | Sarayeddine | 349/8 |
| 5,926,314 A | 7/1999 | Smith et al. | 359/530 |
| 5,963,577 A | 10/1999 | Snyder et al. | 372/101 |
| 6,015,214 A | 1/2000 | Heenan et al. | 359/529 |
| 6,160,672 A | 12/2000 | Chan et al. | 359/819 |
| 6,172,723 B1 | 1/2001 | Inoue et al. | 349/95 |
| 6,231,797 B1 | 5/2001 | Bernard et al. | 264/220 |
| 6,451,408 B1 * | 9/2002 | Haunschild et al. | 428/143 |
| 6,710,926 B2 | 3/2004 | Beach et al. | 359/623 |
| 6,859,326 B2 | 2/2005 | Sales | 359/619 |
| 6,871,966 B2 | 3/2005 | Couzin et al. | 359/530 |
| 6,967,053 B1 * | 11/2005 | Mullen et al. | 428/156 |
| 7,498,071 B2 * | 3/2009 | Sakuma et al. | 428/64.4 |
| 2003/0075815 A1 | 4/2003 | Couzin et al. | 264/1.34 |
| 2003/0193717 A1 | 10/2003 | Gubela, Sr. | 359/529 |
| 2004/0114243 A1 | 6/2004 | Couzin et al. | 359/530 |
| 2004/0169928 A1 * | 9/2004 | Nilsen et al. | 359/529 |
| 2005/0030624 A1 | 2/2005 | Couzin | 359/530 |

* cited by examiner

RETROREFLECTIVE SHEETING

RELATED APPLICATION

This application claims priority under 35 U.S.C. §119(e) to U.S. Provisional Patent Application No. 60/720,523 filed on Sep. 26, 2005. The entire disclosure of this earlier application is hereby incorporated by reference.

FIELD OF THE INVENTION

This invention relates generally, as indicated, to retroreflective sheeting and, more particularly, to retroreflective sheeting comprising a layer having a front light-receiving surface and a rear surface with an array of retroreflective elements formed therein.

BACKGROUND OF THE INVENTION

Retroreflective sheeting is used in highway safety applications to reflect light from a vehicle's headlights back to the eyes of the driver. Retroreflective sheeting typically comprises a transparent layer having a front light-receiving surface and a rear surface with an array of retroreflective elements formed thereon. When incident light reaches the front light-receiving surface, it passes therethrough, impinges on the retroreflective elements, and reflects back out through the front surface at a two-dimensional retroreflective pattern. The divergence range of a retroreflective array is the range of angles for which this pattern is relatively intense so as to be useful for its intended purpose. It is usually preferable for retroreflective sheeting to produce a pattern of retroreflected light with sufficient intensity over a divergence range of at least 1° and preferably 3° or more.

An intentional aberration in one or more retroreflective elements can positively affect (e.g., broaden without introducing undesirable diffraction) the divergence range of an overall array. Historically, aberrations in retroreflective arrays have stemmed from the geometries introduced into the master plate during ruling, these ruled geometries then being transferred to copies/clusters and eventually to the production tool which is used to form the retroreflective sheeting. (See e.g., U.S. Pat. Nos. 3,712,706, 4,775,219, 4,938,563, 6,015,214, US2003/007815A1, etc.). U.S. Pat. No. 6,871,966 each discloses a method of introducing aberration-producing geometries by controlled working of the second "non-arrayed" surface of the master substrate after tooling or by similar controlled working of copy substrates made from the master substrate. (This patent is assigned to the assignee of the present invention and its entire disclosure is hereby incorporated by reference.)

SUMMARY OF THE INVENTION

The present invention provides retroreflective sheeting having a broad divergence range due, at least in part, to a divergence-enhancing layer having localized aberration regions. The invention allows the same expensive tooling to be used to fabricate a plurality of similar retroreflecting layers because different divergence-enhancing layers can be used to create sheeting products of different divergences for different applications. Additionally or alternatively, the divergence-enhancing layer can be used in conjunction with aberrated retroreflective elements to further improve divergence to a degree perhaps not possible with only aberrated retroreflective elements.

More particularly, the present invention provides retroreflective sheeting comprising a retroreflecting layer, which has an array of retroreflective elements (e.g., cube corner elements) formed thereon, and a divergence-enhancing layer. The divergence-enhancing layer is positioned in front of the retroreflecting layer and has localized aberration regions which change the divergence of light traveling therethrough. The placement of the localized aberration regions relative to the retroreflective elements results in the sheeting having a broad divergence range (e.g., at least about 1° and preferably about 3° or more).

The divergence-enhancing layer can comprise a substrate and a plurality of lenses carried by the substrate. The size of the lenses can be comparable to the size of the retroreflective elements whereby, if the retroreflective elements are microcubes and/or micro-optical elements, the lenses can be microlenses. The lenses can occupy only the localized regions whereby their presence (as opposed absence) creates the aberration(s). Alternatively, the lenses can be provided in an array (e.g., a tight two-dimensional array) that covers the localized aberration regions and regions outside thereof. If such an array of lenses is provided, the lenses within the localized aberration regions can have different optical parameters and/or different spacial distribution than the lenses in the outside regions to thereby create the aberration(s).

These and other features of the retroreflective sheeting are fully described and particularly pointed out in the claims. The following description and drawings set forth in detail certain illustrative embodiments of the retroreflective sheeting which are indicative of but a few of the various ways in which the principles of the invention may be employed.

DRAWINGS

DETAILED DESCRIPTION

Figure 1A:
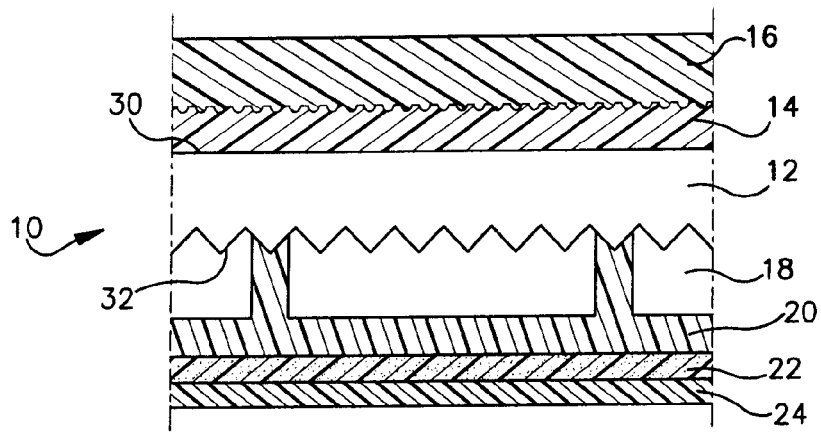
FIGS. 1A-1F are side views of retroreflective sheeting according to the present invention.
Figure 1B:
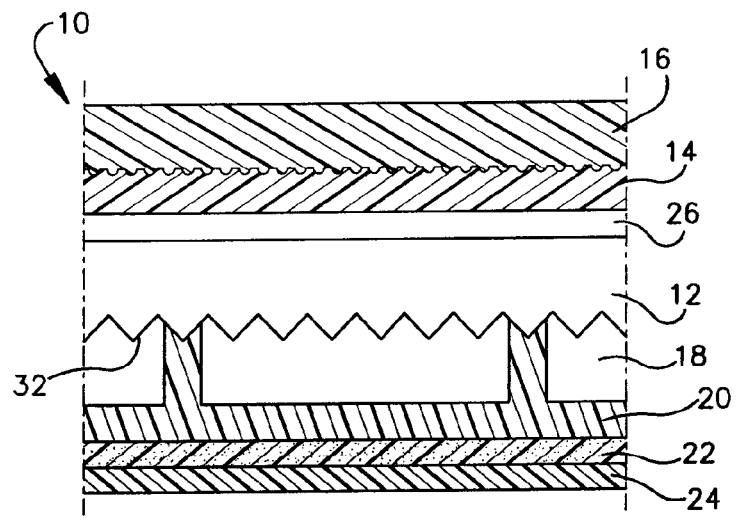
Figure 1C:
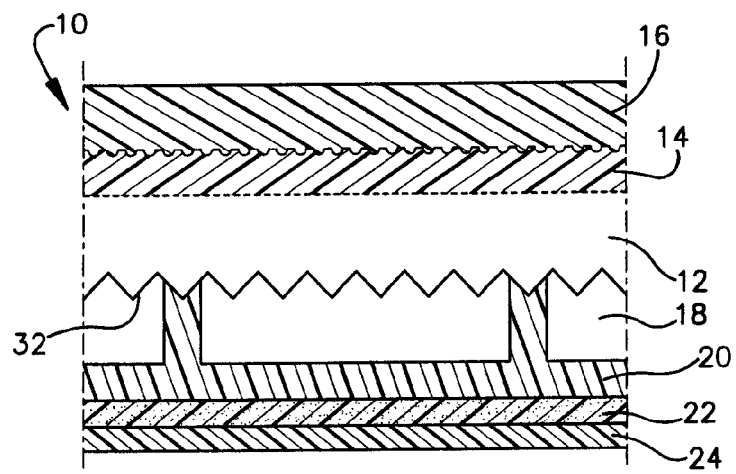

Referring now to the drawings, and initially to FIGS. 1A-1F, retroreflective sheeting 10 according to the present invention is shown. The retroreflective sheeting 10 comprises a retroreflecting layer 12 and a divergence-enhancing layer 14. The sheeting 10 can be used in highway safety applications to reflect light from a vehicle's headlights back to the eyes of the driver in a two-dimensional retroreflective pattern. The range of angles for which this pattern is sufficiently intense is the divergence range of the retroreflective sheeting 10.

The sheeting 10 can include other layers such as, for example, a color layer 16, a reflection-aiding layer 18, a backing layer 20, an adhesive layer 22, and/or removable release layer 24. The color layer 16 will usually be a transparent colored layer providing a color quality to the retroreflected light. The reflection-aiding layer 18 can be a metalized film, granular silica particles, or any other acceptably reflective material. The backing layer 20 can serve as a space-filler behind the layers 12/18 and/or as a carrier for the adhesive layer 22 and, to this end, can comprise a paper, plastic, metal, or other substrate which performs these functions. The adhesive layer 22 is used for attachment to the mounting surface of the end product and can comprise a pressure-sensitive or heat-activated adhesive. The removable release layer 24 can be provided to cover the adhesive layer 22 during pre-mounting stages and can comprise a paper or plastic film with a suitable release coating.

Figure 1D:
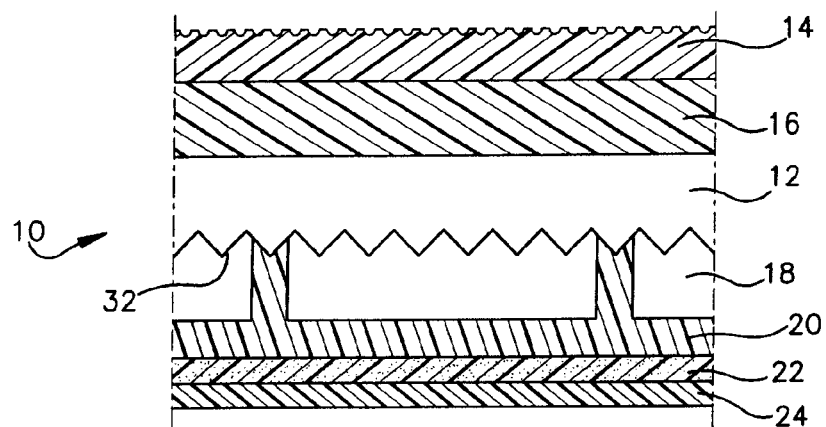
Figure 1E:
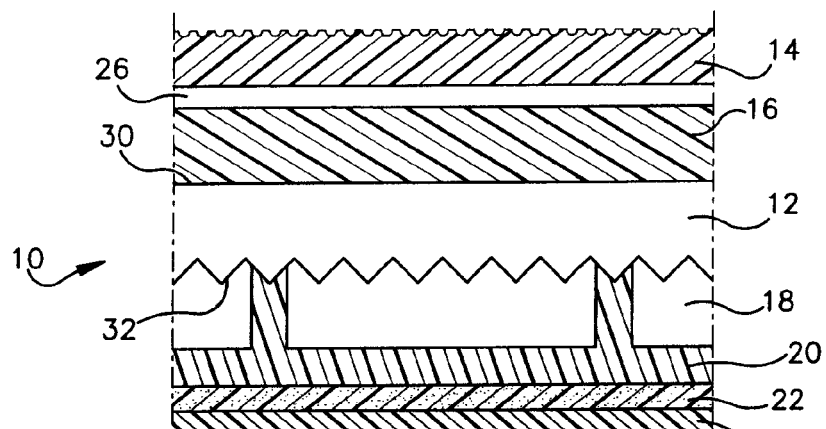
Figure 1F:
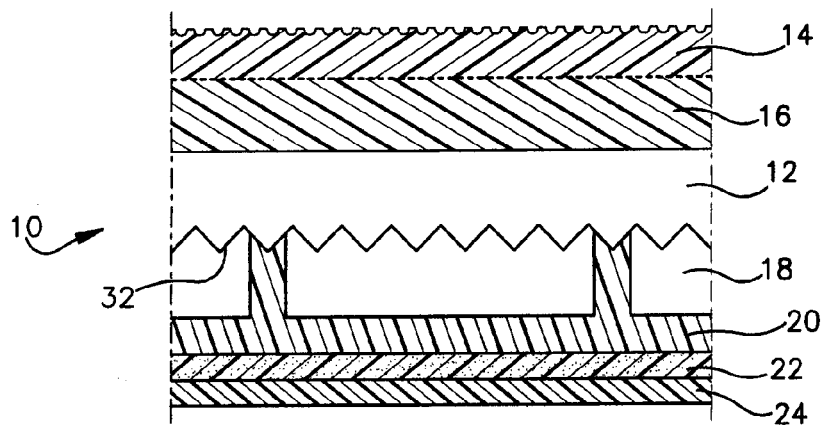

The divergence-enhancing layer 14 is positioned in front of the retroreflecting layer 12. For example, the divergence-enhancing layer 14 can be positioned directly in front of the retroreflecting layer 12 (FIGS. 1A-1C) and, if so, can be laminated directly to the layer 12 (FIG. 1A), adhered to the layer 12 by an optical adhesive 26 (FIG. 1B), or incorporated-integrated into the retroreflecting layer 12 during its fabrication. Alternatively, an intermediate layer (e.g., the color layer 16) can be positioned between the retroreflecting layer 12 and the divergence-enhancing layer 14 (FIGS. 1D-1F). In the latter case, the divergence-enhancing layer 14 can be laminated directly to the intermediate layer (FIG. 1D), adhered to the intermediate layer by an optical adhesive 26 (FIG. 1E), or incorporated-integrated into the intermediate layer during its fabrication (FIG. 1F).

Figure 2:
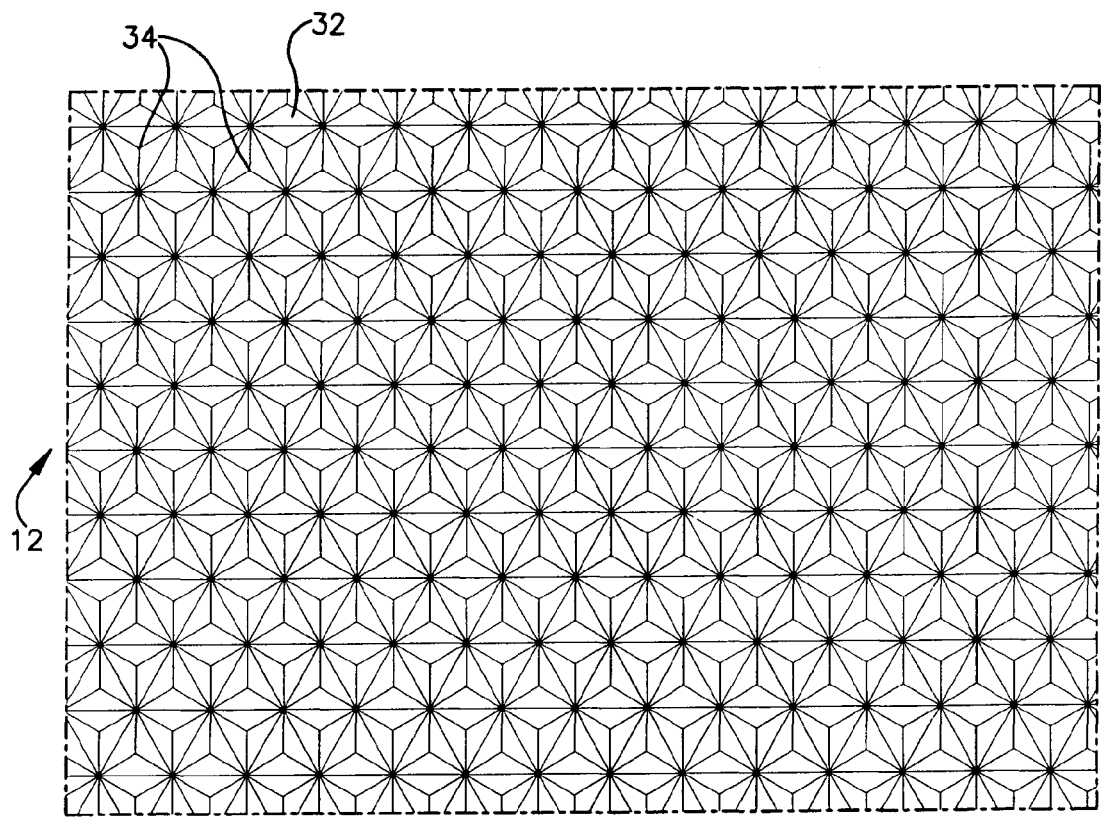
FIG. 2 is a rear view of a retroreflecting layer of the sheeting, this layer including an array of retroreflective elements.
Figure 2A:
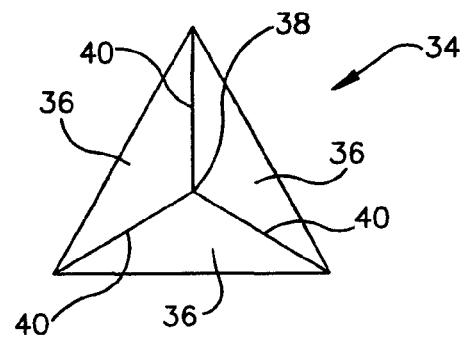
FIG. 2A is a close-up rear view of a retroreflective element.

The retroreflecting layer 12 comprises a front light-receiving surface 30 and a rear surface 32 on which a plurality of retroreflective elements 34 are formed. As is best seen by referring additionally to FIG. 2 (and FIG. 2A), the retroreflective elements 34 can comprise cube corner elements. If so, each retroreflective element 34 has three mutually perpendicular faces 36 that meet an apex 38 and that intersect with each other at dihedral edges 40. (In a geometrically perfect cube corner element, the dihedral angles would each be exactly 90°.) The cube area of each retroreflective element 34 can be about 1 mm$^2$ or less and, if so, the elements 34 can be considered microcubes (or, more generally, micro-optical elements). The retroreflecting layer 12 can be made of any suitable thermoplastic material which is compatible with desired manufacturing methods (e.g., acrylic, vinyl, polycarbonate, etc.).

Figure 3:
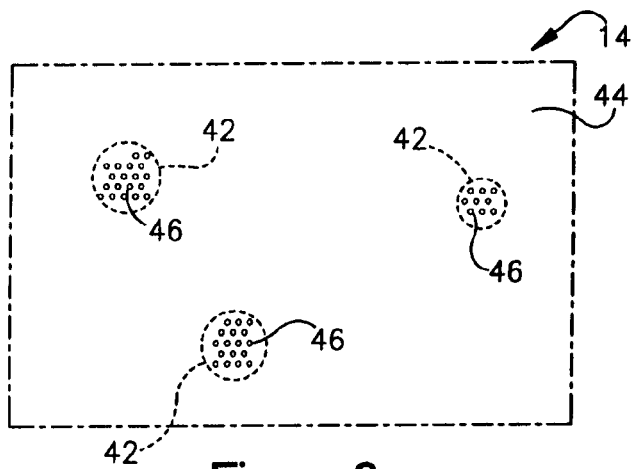
FIG. 3 is a front and isolated view of a divergence-enhancing layer having localized aberration regions according to one embodiment of the invention.
Figure 4:
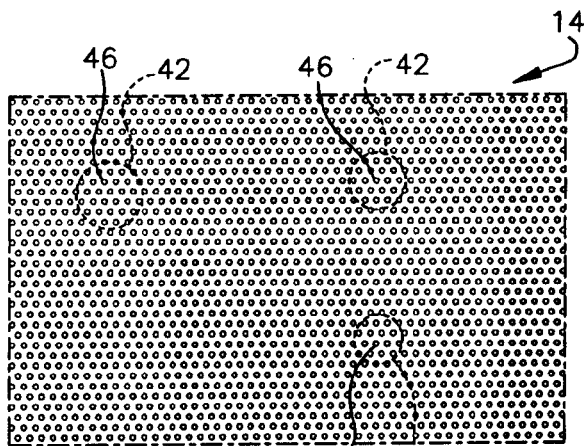
FIG. 4 is a front and isolated view of a divergence-enhancing layer having localized aberration regions according to another embodiment of the invention.
Figure 5:
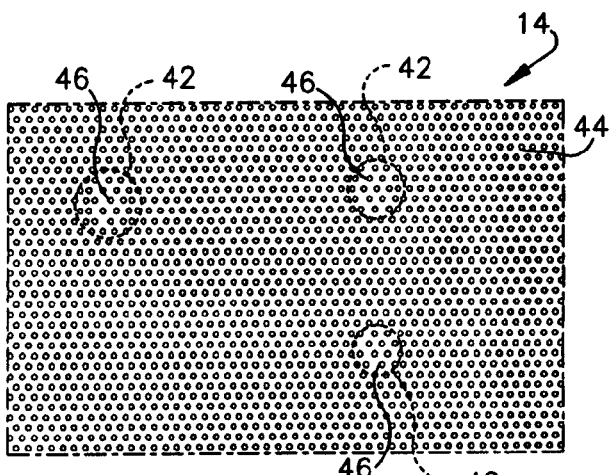
FIG. 5 is a front and isolated view of a divergence-enhancing layer having localized aberration regions according to a further embodiment of the invention.

As is best seen by referring to FIGS. 3-5, which show the divergence-enhancing layer isolated from the other layers of the retroreflective sheeting 10, this layer 14 comprises localized aberration regions 42 which change the divergence of light traveling therethrough. The placement of the regions 42, and/or the divergence-changing qualities, of each region 42 can be the same or varied (e.g., patterned or semi-random). In either or any case, this placement and/or these qualities cause the retroreflective sheeting 10 to have a broader divergence range than it would without the divergence-enhancing layer 14. For example, if the retroreflective elements 34 are geometrically perfect (or almost geometrically perfect), the retroreflecting layer 12 be optically capable of providing a divergence range of about 0° to 0.5°. With the divergence-enhancing layer 14, the retroreflected light can have sufficient intensity over a much wider range of observation angles (e.g., at least 1° and preferably 3° or more). Preferably, the total retroreflectance of the layer 12 is substantially preserved (i.e., the sheeting 10 still provides a total retroreflectance that is at least 90%, at least 94% and/or at least 98% of the total retroreflectance of the layer 12).

In the preferred embodiment, the divergence-enhancing layer 14 comprises a substrate 44 and a plurality of lenses 46 carried the substrate 44. The substrate 44 can be made from a transmissive material (e.g., glass, plastic) that is capable of supporting the lenses 46 and/or that is compatible with the fabrication of the lenses 46 thereon. The lens structure can be made by energy modification, chemical coating, or extrusion of the substrate 44 or a coating thereon, by the integration of glass beads into the substrate 44 or a sub-level thereof, by differentiated dispersions inside the substrate 44 or a film applied thereto, and/or by the incorporation of soluble and insoluble species into the substrate 44.

The lenses 46 each have a geometry (e.g., hemispherical or cylindrical, concave or convex, etc.) and given optical parameters (e.g., radii of curvature, conic constants, focal points, aspheric coefficients, etc.). If the lenses 46 are arranged in a tight two-dimensional array (see e.g., FIGS. 4 and 5), this array itself will have certain optical parameters dictated by the optical parameters of each lenses 46 and the spacial distribution of the lenses 46 within the array. In the preferred embodiment, the size of the lenses 46 is comparable to the size of the retroreflective elements 34 whereby, if the elements 34 are microcubes, the lenses 46 will be microlenses (i.e., a lens having a diameter, or other analogous dimension, that is less than 1 mm).

Figure 3A:
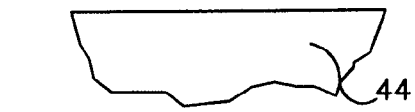
FIG. 3A is a close-up partial side view of the divergence-enhancing layer shown in FIG. 3, this view showing the absence of lenses outside the localized aberration regions.
Figure 3B:
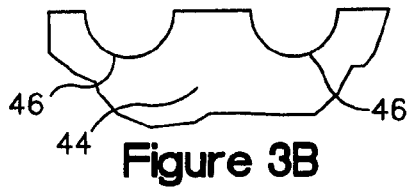
FIG. 3B is a close-up partial side view of the divergence-enhancing layer shown in FIG. 3, the view showing the presence of lenses within the localized aberration regions.
Figure 4A:
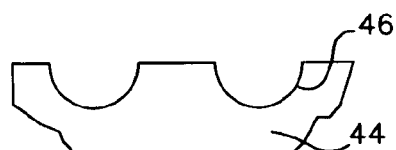
FIG. 4A is a close-up partial side view of the divergence-enhancing layer shown in FIG. 4, the view showing lenses occupying areas outside the localized aberration regions.
Figure 4B:
FIG. 4B is a close-up partial side view of the divergence-enhancing layer shown in FIG. 4, the view showing lenses within the localized aberration regions that have different optical parameters than the lenses outside of the localized aberration regions.
Figure 5A:
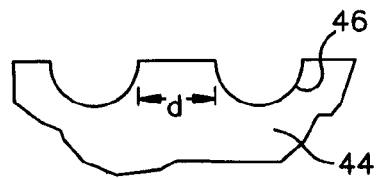
FIG. 5A is a close-up partial side view of the divergence-enhancing layer shown in FIG. 5, this view showing lenses that occupy areas outside the localized aberration regions.
Figure 5B:
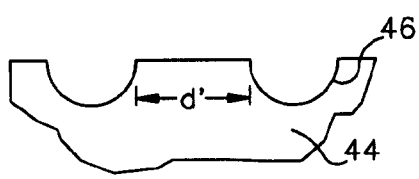
FIG. 5B is a close-up partial side view of the divergence-enhancing layer shown in FIG. 5, this view showing lenses within the localized aberration regions that have a different spatial distribution than the lenses outside the localized aberration regions.

The lenses 46 can be present only in the localized regions 42 whereby their presence creates the aberration in contrast to the non-lense regions of the layer 14. (FIGS. 3, 3A and 3B.) Alternatively, the lenses 46 can be provided in an array 48, preferably a tight two-dimensional array, which can (or cannot) correspond to the array 32 of the retroreflective elements 34. (FIGS. 4 and 5.) If an array of lenses 46 is provided, the individual lenses 46 in the localized regions 42 can have a shape corresponding to optical parameters which differ from those of the lenses 46 outside the localized regions 42 to thereby provide the desired aberration(s). (FIGS. 4A and 4B.) Additionally or alternatively, the spacial distribution of the lenses 46 within the localized regions 42 can differ from the spacial distribution of the lenses 46 in outside regions to thereby provide the desired aberration(s). (FIGS. 5A and 5B.) (To insure that the shape and spacial differences were visible for comparison, these features may have been greatly exaggerated in the drawings.)

Other lense arrangements and/or other techniques for providing different diffusion qualities within the localized areas 42 are certainly possible with, and contemplated by, the present invention. For an example, the lenses 46 could be provided in multiple levels, which are aligned or offset from each other, to provide the desired aberration(s). For another example, the localized regions 42 could have different material characteristics (e.g., by injection of a structure-changing substance into this area) or could have different profiles (e.g., slanted, sloped, recessed, or projected) to provide the desired aberration(s). Such different material characteristics and/or profiles could be used instead of, or in addition to, the lenses 46.

The present invention allows the same retroreflecting layer 12 (and thus the same expensive tooling) to be used to fabricate a plurality of similar retroreflecting layers 12 and then different divergence-enhancing layers 14 used to create sheeting products of different divergences for different applications. This feature can eliminate the need to customize tooling to provide aberrations in the retroreflecting element 34 themselves. That being said, the use of the divergence-enhancing layer 14 with already aberrated retroreflective elements 34 is certainly possible with and contemplated by, the present invention. In certain retroreflecting situations, an optimum divergence range may be accomplished by the combination of aberrated retroreflective elements and the localized aberration regions 42 on the divergence-enhancing layer 14. In such situations, the localized aberration regions 42 can be aligned with aberrated retroreflective elements and/or aligned with non-aberrated retroreflective elements depending upon what provides the desired divergence.

One may now appreciate that the present invention provides retroreflective sheeting 10 having a broad divergence range due, at least in part, to the divergence-enhancing layer 14. Although the retroreflective sheeting 10 has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

The invention claimed is:

1. Retroreflective sheeting comprising;
   a retroreflecting layer having a front light receiving surface and a rear surface which has an array of cube corner retroreflective elements formed thereon, and
   a divergence-enhancing layer which is positioned in front of the retroreflecting layer and which has localized aberration regions which change the divergence of light traveling therethrough, wherein the divergence-enhancing layer comprises a substrate and a plurality of aberrated lenses carried by the substrate, the aberrated lenses present only in the localized aberration region;
   wherein the sheeting with the divergence-enhancing layer has a broader divergence range of at least 1° than that provided by the retroreflecting layer alone.

2. Retroreflective sheeting as set forth in claim 1, further comprising one or more additional layers, wherein the one or more additional layers is selected from a group including a color layer, a reflection-aiding layer, a backing layer, an adhesive layer, and a removable release layer.

3. Retroreflective sheeting as set forth in claim 1, wherein the divergence enhancing layer is positioned directly in front of the retroreflecting layer.

4. Retroreflective sheeting as set forth in claim 1, wherein an intermediate layer is positioned between the retroreflecting layer and the divergence-enhancing layer.

5. Retroreflective sheeting as set forth in claim 1, wherein the placement of the localized aberration regions of the divergence enhancing layer are substantially the same as regions of aberration for the cube corner retroreflective elements.

6. Retroreflective sheeting as set forth in claim 1, wherein the placement of the localized aberration regions of the divergence enhancing layer are substantially different from regions of aberration for the cube corner retroreflective elements.

7. Retroreflective sheeting as set forth in claim 1, wherein the divergence range would be about 0° to 0.5° without the divergence-enhancing layer.

8. Retroreflective sheeting as set forth in claim 1, wherein the divergence enhancing layer preserves at least 90% of the total retroreflectance of the retroreflecting layer.

9. Retroreflective sheeting as set forth in claim 1, wherein the lenses are of a dimension comparable to the size of the retroreflective elements.

10. Retroreflective sheeting as set forth in claim 1, wherein substantially all of the retroreflective elements are non-aberrated.

11. Retroreflective sheeting as set forth in claim 1, wherein some of the retroreflective elements are aberrated.

12. Retroreflective sheeting as set forth in claim 1, wherein the divergence range is more than about 3°.

13. Retroreflective sheeting as set forth in claim 1, wherein the divergence-enhancing layer has only aberrated lenses.

14. Retroreflective sheeting as set forth in claim 1, wherein the divergence-enhancing layer further includes non-aberrated lenses on the substrate outside the localized aberration region.

15. Retroreflective sheeting, comprising:
   a retroreflecting layer having a front light receiving surface and a rear surface which has an array of cube corner retroreflective elements formed thereon, wherein some of the retroreflective elements are aberrated, and
   a divergence-enhancing layer which is positioned in front of the retroreflecting layer and which has localized aberration regions which change the divergence of light traveling, and wherein the position of the aberrated retroreflective elements corresponds to the position of the localized aberration regions;
   wherein the sheeting with the divergence-enhancing layer has a broader divergence range of at least 1° than that provided by the retroreflecting layer alone.

16. Retroreflective sheeting as set forth in claim 15, wherein the divergence range is more than about 3°.

17. An enhanced-divergence retroreflective sheeting, the retroreflective sheeting comprising:
   a retroreflecting layer having a front light receiving surface and a rear surface which has an array of cube corner retroreflective elements formed thereon;
   a divergence-enhancing layer positioned in front of the retroreflecting layer, the divergence-enhancing layer including a substrate, a first and a second lens array carried by the substrate, the divergence-enhancing layer having at least localized aberration regions and non-localized aberration regions, with the first lens array is present only in the localized aberration regions and the second lens array present only in the non-localized aberration regions, the localized aberration regions and the non-localized aberrations regions change the divergence of light traveling therethrough a different amount; and
   wherein the sheeting with the divergence-enhancing layer has a broader divergence range of at least 1° than that provided by the retroreflecting layer alone.

18. The retroreflective sheeting of claim 17, wherein the first lens array uses aberrated lenses.

19. The retroreflective sheeting of claim 17, wherein the first lens array has a different spatial arrangement of lenses than the second lens array.

20. The retroreflective sheeting of claim 17, wherein the array of cube corner retroreflective elements further comprise aberrated cube corner retroreflective elements.

* * * * *